United States Patent
Asaine

(10) Patent No.: US 7,034,073 B2
(45) Date of Patent: Apr. 25, 2006

(54) HEAT CONDUCTIVE SILICONE COMPOSITION AND SHAPED ARTICLE

(75) Inventor: Masaya Asaine, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 79 days.

(21) Appl. No.: 10/720,131

(22) Filed: Nov. 25, 2003

(65) Prior Publication Data

US 2004/0106717 A1    Jun. 3, 2004

(30) Foreign Application Priority Data

Nov. 29, 2002   (JP)   .............................. 2002-346964

(51) Int. Cl.
*C08L 83/05*   (2006.01)

(52) U.S. Cl. ...................... 524/588; 524/430; 524/431; 524/433; 524/434; 524/437; 524/429; 528/15; 528/31

(58) Field of Classification Search ................ 524/588, 524/430, 431, 433, 434, 437, 429; 528/15, 528/31
See application file for complete search history.

(56) References Cited

U.S. PATENT DOCUMENTS

| 3,159,601 A | 12/1964 | Ashby |
| 3,159,662 A | 12/1964 | Ashby |
| 3,220,972 A | 11/1965 | Lamoreaux |
| 3,775,452 A | 11/1973 | Karstedt |
| 6,069,201 A * | 5/2000 | Okinoshima et al. ....... 524/783 |
| 6,649,258 B1 * | 11/2003 | Yamada et al. ............. 428/334 |

FOREIGN PATENT DOCUMENTS

JP      2002-33427     1/2002

OTHER PUBLICATIONS

Kirk-Othmer:Encyclopedia of Chemical Technology, vol. 20 "Silicones", p. 943, 1982.*

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A heat conductive silicone composition comprising (a) an organopolysiloxane having alkenyl groups only at both ends of a molecular chain, (b) a heat conductive filler, (c) an organohydrogenpolysiloxane having Si—H groups only at both ends of a molecular chain, and (d) a platinum group curing catalyst is shaped into an article which conforms to a member and permits heat to dissipate from the member without applying stresses thereto.

19 Claims, No Drawings

HEAT CONDUCTIVE SILICONE COMPOSITION AND SHAPED ARTICLE

BACKGROUND OF THE INVENTION

1. Field of the Invention

This invention relates to a heat conductive silicone composition and a heat conductive silicone article obtained by shaping the composition into a sheet. The heat conductive silicone article is effective as a heat transfer medium interposed between a thermal boundary face of a heat generating electronic part and a heat sink or a heat dissipating member as in a circuit board for the purpose of cooling the electronic part.

2. Background Art

Now that CPUs, driver ICs, memories and other LSI chips used in electronic equipment such as personal computers, digital versatile disks, and mobile phones have made great progress toward higher performance, higher operating speed, size reduction and higher integration, they generate large amounts of heat by themselves. A temperature ramp of a chip by such heat causes malfunction and even failure to the chip. Thus, a number of heat dissipating techniques and heat dissipating members used therefor have been proposed for restraining the chip from a temperature rise during operation.

In prior art electronic equipment, a heat sink in the form of a plate of aluminum, copper or similar metal having a high heat conductivity is used for restraining the chip from a temperature rise during operation. The heat sink functions to conduct the heat generated by the chip and release the heat from its surface by utilizing the temperature difference between the heat sink and the ambient air.

For efficient transfer of the heat generated by the chip to the heat sink, the heat sink must be placed in close contact with the chip. Because of difference in chip dimensions and tolerances associated with assemblage, a flexible sheet or grease is often interposed between the chip and the heat sink so that heat transfer takes place from the chip to the heat sink via the sheet or grease.

Since sheets are easy to handle as compared with grease, heat conductive sheets made of heat conductive silicone rubber or the like (typically heat conductive silicone rubber sheets) are used in a variety of applications.

For these heat conductive sheets, a strong stress is often applied to compress the sheet in order to improve its contact with the chip and the heat sink. In the case of an elastomer sheet, residual stresses can adversely affect the chip. JP-A 2002-33427 discloses a heat dissipating sheet prepared by applying an organohydrogensiloxane to a film, sandwiching an unvulcanized compound between a pair of coated films, and heat molding the assembly, thereby producing a heat dissipating sheet comprising thin film reinforcing layers of cured rubber as upper and lower surface layers and an unvulcanized compound layer therebetween. However, the step of applying organohydrogensiloxane to upper and lower films is added to the molding process, which becomes disadvantageous for mass-scale manufacture.

SUMMARY OF THE INVENTION

An object of the invention is to provide a heat conductive silicone composition which is flowable and ready for continuous shaping, and forms a non-elastic shaped part which can be handled as a sheet, and a heat conductive silicone article obtained by shaping the composition.

It has been found that a heat conductive silicone composition comprising (a) 100 parts by weight of an organopolysiloxane having alkenyl groups only at both ends of a molecular chain, (b) 200 to 3,000 parts by weight of a heat conductive filler, (c) an organohydrogenpolysiloxane having silicon atom-bonded hydrogen atoms (Si—H groups) only at both ends of a molecular chain, in such an amount that 0.1 to 5 moles of Si—H groups are available per mole of alkenyl groups in component (a), and (d) a platinum group base curing catalyst in an amount to give 0.1 to 500 ppm of platinum group element based on the weight of component (a) is flowable and ready for continuous shaping, and forms a non-elastic shaped part which can be handled as a sheet.

Therefore, the present invention provides a heat conductive silicone composition comprising (a) 100 parts by weight of an organopolysiloxane having alkenyl groups only at both ends of a molecular chain, (b) 200 to 3,000 parts by weight of a heat conductive filler, (c) an organohydrogenpolysiloxane having hydrogen atoms directly bonded to silicon atoms (Si—H groups) only at both ends of a molecular chain, in such an amount that 0.1 to 5 moles of Si—H groups are available per mole of alkenyl groups in component (a), and (d) a platinum group base curing catalyst in an amount to give 0.1 to 500 ppm of platinum group element based on the weight of component (a).

Also contemplated herein is a heat conductive silicone article obtained by shaping, molding or forming the composition into a sheet.

DESCRIPTION OF THE PREFERRED EMBODIMENTS

Component (a) is an organopolysiloxane having an alkenyl group at each end of a molecular chain, that is, two alkenyl groups in total. In general, an organopolysiloxane whose backbone consists essentially of recurring diorganosiloxane units is preferred.

Specifically, the organopolysiloxane has the general formula (1):

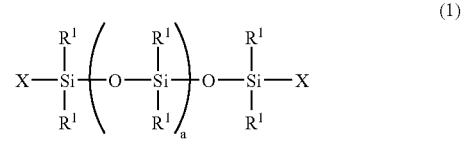

wherein $R^1$ is independently a substituted or unsubstituted monovalent hydrocarbon group free of aliphatic unsaturation, X is an alkenyl group, and "a" is 0 or an integer of at least 1.

The aliphatic unsaturation-free, substituted or unsubstituted, monovalent hydrocarbon groups represented by $R^1$ are preferably those of 1 to 10 carbon atoms, especially 1 to 6 carbon atoms, including alkyl groups such as methyl, ethyl, propyl, isopropyl, butyl, isobutyl, tert-butyl, pentyl, neopentyl, hexyl, heptyl, octyl, nonyl, decyl and dodecyl, cycloalkyl groups such as cyclopentyl, cyclohexyl and cycloheptyl, aryl groups such as phenyl, tolyl, xylyl, naphthyl and biphenylyl, aralkyl groups such as benzyl, phenylethyl, phenylpropyl and methylbenzyl, and substituted ones of the foregoing groups in which some or all of the hydrogen atoms bonded to carbon atoms are substituted with halogen atoms (e.g., fluoro, chloro, bromo), cyano groups or the like, such as chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl. Of these, preferred are substituted or unsubstituted alkyl groups of 1 to 3 carbon atoms such as methyl, ethyl, propyl, chloromethyl, bromoethyl, 3,3,3-trifluoropropyl, and cyanoethyl, and substituted or unsubstituted phenyl groups such as phenyl, chlorophenyl and fluorophenyl. All of $R^1$ may be the same or different.

The alkenyl group represented by X are preferably those of about 2 to about 8 carbon atoms, such as vinyl, allyl, propenyl, isopropenyl, butenyl, hexenyl, and cyclohexenyl. Of these, lower alkenyl groups such as vinyl and allyl are preferred, with vinyl being most preferred.

The subscript "a" is 0 or an integer of at least 1, preferably an integer in the range of 10 to 10,000, more preferably an integer in the range of 50 to 2,000, and even more preferably an integer in the range of 100 to 1,000.

The organopolysiloxanes may be used alone or in admixture of two or more having different viscosities.

Component (b) is a heat conductive filler. There may be used any of materials commonly used as the heat conductive filler, for example, non-magnetic metals such as copper and aluminum, metal oxides such as alumina, silica, magnesia, iron oxide, beryllia, titania and zirconia, metal nitrides such as aluminum nitride, silicon nitride and boron nitride, artificial diamond, and silicon carbide.

These heat conductive fillers are generally in the form of particles having an average particle size of 0.1 to 100 μm, desirably 0.5 to 50 μm, more desirably 0.5 to 30 μm. The fillers may be used alone or in admixture of any. It is acceptable to use a mixture of two or more particle fractions having different average particle sizes.

The amount of heat conductive filler blended is 200 to 3,000 parts, preferably 300 to 1,500 parts by weight per 100 parts by weight of component (a). Too much amounts of the heat conductive filler detract from fluidity and interfere with coating whereas too less amounts fail to provide desired heat conductivity.

Component (c) is an organohydrogenpolysiloxane having hydrogen atoms directly bonded to silicon atoms (Si—H groups) only at both ends of a molecular chain. Specifically, the organohydrogenpolysiloxane has the average structural formula (2):

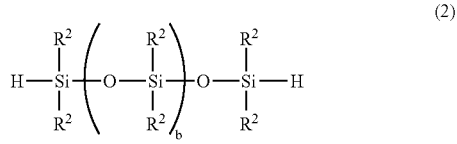

(2)

wherein $R^2$ is independently a substituted or unsubstituted monovalent hydrocarbon group free of aliphatic unsaturation, and "b" is 0 or a positive number.

The aliphatic unsaturation-free, substituted or unsubstituted, monovalent hydrocarbon groups represented by $R^2$ are preferably those of 1 to 10 carbon atoms, especially 1 to 6 carbon atoms, including alkyl groups such as methyl, ethyl, propyl, isopropyl, butyl, isobutyl, tert-butyl, pentyl, neopentyl, hexyl, heptyl, octyl, nonyl, decyl and dodecyl, cycloalkyl groups such as cyclopentyl, cyclohexyl and cycloheptyl, aryl groups such as phenyl, tolyl, xylyl, naphthyl and biphenylyl, aralkyl groups such as benzyl, phenylethyl, phenylpropyl and methylbenzyl, and substituted ones of the foregoing groups in which some or all of the hydrogen atoms bonded to carbon atoms are substituted with halogen atoms (e.g., fluoro, chloro, bromo), cyano groups or the like, such as chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl. Of these, preferred are substituted or unsubstituted alkyl groups of 1 to 3 carbon atoms such as methyl, ethyl, propyl, chloromethyl, bromoethyl, 3,3,3-trifluoropropyl, and cyanoethyl, and substituted or unsubstituted phenyl groups such as phenyl, chlorophenyl and fluorophenyl. All of $R^2$ may be the same or different.

The subscript "b" is 0 or a positive number, preferably a number in the range of 0 to 500, more preferably a positive number in the range of 5 to 100, and even more preferably a positive number in the range of 10 to 50.

Component (c) is added in such an amount that 0.1 to 5 moles, desirably 0.3 to 3 moles, and more desirably 0.5 to 2 moles of Si—H groups in component (c) are available per mole of alkenyl groups in component (a). If the amount of Si—H groups in component (c) is less than 0.1 mole or more than 5 moles per mole of alkenyl groups in component (a), the desired sheets are not obtainable.

Component (d) is a platinum group base curing catalyst which serves to promote the addition reaction between alkenyl groups in component (a) and Si—H groups in component (c). There may be used any of well-known catalysts commonly used in hydrosilylation reaction. Examples include elemental platinum group metals such as platinum (inclusive of platinum black), rhodium and palladium, platinum chlorides such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, and $Na_2HPtCl_4 \cdot nH_2O$, wherein n is an integer of 0 to 6, preferably 0 or 6, chloroplatinic acid and chloroplatinic acid salts, alcohol-modified chloroplatinic acids (see U.S. Pat. No. 3,220,972), complexes of chloroplatinic acid with olefins (see U.S. Pat. No. 3,159,601, U.S. Pat. No. 3,159,662, and U.S. Pat. No. 3,775,452), platinum group metals such as platinum black and palladium on supports such as alumina silica and carbon, rhodium-olefin complexes, chlorotris(triphenylphosphine)rhodium (Wilkinson catalyst), and complexes of platinum chloride, chloroplatinic acid or chloroplatinic acid salt with vinyl-containing siloxanes, especially vinyl-containing cyclic siloxanes.

Component (d) is used in a catalytic amount, usually in an amount to give 0.1 to 500 ppm, desirably 0.5 to 200 ppm, more desirably 1.0 to 100 ppm of platinum group element based on the weight of component (a).

To the silicone composition of the invention, various additives for improving certain functions may be added insofar as the objects of the invention are not impaired. Exemplary additives include, but are not limited to, surface treating agents for the heat conductive filler, reaction inhibitors for adjusting the curing rate, pigments and dyes for coloring, flame retardants, and internal release agents for smoothing separation from molds and separator films.

The silicone composition of the invention may be prepared by mixing the above-described components in a conventional manner.

When the inventive silicone composition is shaped, molded or formed into a sheet, the conditions used may be the same as used for well-known addition reaction curing type silicone rubber compositions. Sheeting is possible even at room temperature although heating may be employed if desired. It is also possible to apply the composition onto a heat radiating sheet which has been shaped into a sheet, and shape the composition thereon. The heat radiating sheet which has been shaped into a sheet is commercially available under the trade name TC-20A from Shin-Etsu Chemical Co., Ltd.

The inventive silicone composition thus obtained is flowable and ready for continuous shaping and forms a non-elastic shaped article which can be handled as a sheet. The shaped article of the silicon composition has good heat conductivity and conforms to the contour of a member to be heat-dissipated so that satisfactory heat dissipation is achieved without applying stresses to the member.

It is noted that the hardness of the sheet is difficult to measure or manage with an ordinary hardness meter for elastomers. As a substitute index for the hardness, the penetration of a loaded needle into a block into which the composition is molded may be used. Specifically, the composition block preferably has a penetration of 10 to 200, more preferably 20 to 150, even more preferably 40 to 120 as measured by a penetrometer for asphalt according to JIS K 2207.

EXAMPLE

Examples of the invention are given below by way of illustration and not by way of limitation. In the examples, the viscosity is a measurement at 25° C., percents are by weight, and Me is methyl.

Example 1

A Shinagawa universal mixer was charged with 500 g of vinyl end-capped dimethylorganopolysiloxane having a viscosity of 600 mm/s and 2,000 g of alumina having an average particle size of 4 Mm, which were mixed for 60 minutes. The mixture was milled on a three-roll mill, yielding a uniform liquid base.

To 500 g of the liquid base were added 0.2 g of a 2% 2-ethylhexanol solution of chloroplatinic acid and 0.2 g of a 50% toluene solution of ethynyl cyclohexanol. The ingredients were mixed until uniform.

Further, 13 g of an organohydrogenpolysiloxane having the average structural formula:

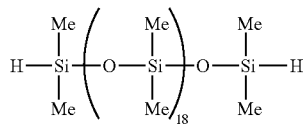

was added to the mixture, which was uniformly mixed to give a composition "a." The composition "a" thus prepared was coated onto a PET film to a thickness of 1.0 mm and heated at 120° C. for 10 minutes to form a sheet A. The sheet A was measured for compression stress and thermal resistance by the following tests. Separately, the composition "a" was cast into a glass dish having an inner diameter of 45 mm and a depth of 30 mm and heated at 120° C. for 30 minutes to form a cured block. The penetration into the block was measured using a penetrometer RPM-101 (Rigo Co., Ltd.). The results are shown in Table 1.

The compression stress was measured using an autograph AG-I (Shimadzu Mfg. Co., Ltd.) by compressing the sheet by every 0.1 mm at a rate of 0.5 mm/min. The peak value is the highest compression stress over the duration from the start to the interruption of compression. The value after 1 minute is a reading of compression stress after 1 minute from the interruption of compression.

The thermal resistance was measured by placing sheet "A" between a model heater having a heater embedded in a transistor TO-3 type aluminum casing (installation area 7 cm$^2$) and a heat sink (LEX flat heat sink 60F230×70 mm, Marusan Electric Co., Ltd.), applying a load of 300 gf/cm$^2$ to bring them in pressure contact, supplying a power of 28 W across the model heater, and measuring the temperature $T_1$ of the model heater and the temperature $T_2$ of the heat sink by means of thermocouples. The thermal resistance of the sample was calculated according to the following equation.

Thermal resistance $R=(T_1-T_2)/28$

Comparative Example 1

To 500 g of the liquid base prepared in Example 1 were added 0.2 g of a 2% 2-ethylhexanol solution of chloroplatinic acid and 0.2 g of a 50% toluene solution of ethynyl 5 cyclohexanol. The ingredients were mixed until uniform.

Further, 6.5 g of an organohydrogenpolysiloxane having the average structural formula:

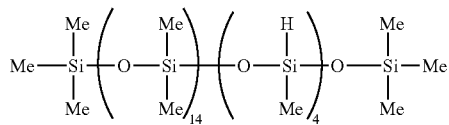

was added to the mixture, which was uniformly mixed to give a composition "b." The composition "b" thus prepared was coated onto a PET film to a thickness of 1.0 mm and heated at 120° C. for 10 minutes to form a sheet B. The sheet B was measured for stress variations upon compression and thermal resistance by the same tests as in Example 1. The Asker C hardness of the sheet was also measured. The results are shown in Table 1.

TABLE 1

| Measurement results | | | Example 1 | Comparative Example 1 |
|---|---|---|---|---|
| Compression stress (MPa) | 10% compression | Peak | 0.45 | 0.46 |
| | | After 1 min | 0.02 | 0.27 |
| | 20% compression | Peak | 0.68 | 0.87 |
| | | After 1 min | 0.03 | 0.55 |
| | 30% compression | Peak | 0.99 | 1.40 |
| | | After 1 min | 0.05 | 0.92 |
| | 40% compression | Peak | 1.46 | 2.10 |
| | | After 1 min | 0.11 | 1.4 |
| | 50% compression | Peak | 2.15 | 3.11 |
| | | After 1 min | 0.30 | 2.18 |
| Thermal resistance (° C./W) | | | 0.70 | 1.21 |
| Hardness (Asker C) | | | —* | 45 |
| Penetration | | | 96.5 | —* |

*unmeasurable

Example 2

The composition "a" prepared in Example 1 was coated onto a sheet TC-20A of 0.2 mm thick (Shin-Etsu Chemical Co., Ltd.) to a thickness of 0.8 mm, summing to a total thickness of 1.0 mm, and heated at 120° C. for 10 minutes to form a sheet C. The sheet C was measured for stress variations upon compression and thermal resistance by the same tests as in Example 1. The results are shown in Table 2.

Comparative Example 2

The composition "b" prepared in Comparative Example 1 was coated onto a sheet TC-20A of 0.2 mm thick (Shin-Etsu Chemical Co., Ltd.) to a thickness of 0.8 mm, summing to a total thickness of 1.0 mm, and heated at 120° C. for 10 minutes to form a sheet D. The sheet D was measured for stress variations upon compression and thermal resistance by the same tests as in Example 1. The results are shown in Table 2.

TABLE 2

| Measurement results | | | Example 2 | Comparative Example 2 |
|---|---|---|---|---|
| Compression stress (MPa) | 10% compression | Peak | 0.54 | 0.60 |
| | | After 1 min | 0.04 | 0.35 |
| | 20% compression | Peak | 0.89 | 1.35 |
| | | After 1 min | 0.09 | 0.88 |
| | 30% compression | Peak | 1.82 | 3.51 |
| | | After 1 min | 0.24 | 2.42 |
| Thermal resistance (° C./W) | | | 0.82 | 1.28 |

Shaped articles of the heat conductive silicone composition of the invention conform to the contour of members to be heat-dissipated and achieve satisfactory heat dissipation without applying stresses to the members.

Japanese Patent Application No. 2002-346964 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A heat conductive silicone composition comprising
   (a) 100 parts by weight of an organopolysiloxane having alkenyl groups only at both ends of a molecular chain,
   (b) 200 to 3,000 parts by weight of a heat conductive filler,
   (c) an organohydrogen polysiloxane component consisting of at least one organohydrogen polysiloxane having hydrogen atoms directly bonded to silicon atoms (Si—H groups) only at both ends of a molecular chain, in such an amount that 0.1 to 5 moles of Si—H groups are available per mole of alkenyl groups in component (a), and
   (d) a platinum group base curing catalyst in an amount to give 0.1 to 500 ppm of platinum group element based on the weight of component (a),
   wherein the compositions when cured is non-elastic and has a penetration of 10 to 200 according to JIS K2207.
2. The composition of claim 1 wherein the heat conductive filler is selected from the group consisting of metals, oxides, nitrides, silicides, artificial diamond and mixtures thereof.
3. A heat conductive silicone article obtained by shaping the composition of claim 1 into a sheet.

4. A heat conductive silicone article shaped by applying the composition of claim 1 onto a heat dissipating sheet.
5. The composition of claim 1, wherein the organopolysiloxane has the following formula:

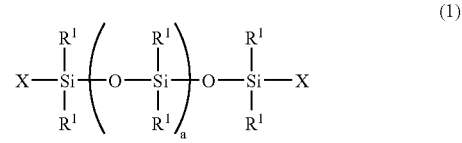

wherein $R^1$ is independently a substituted or unsubstituted monovalent hydrocarbon group free of aliphatic unsaturation, X is an alkenyl group, and "a" is 0 or an integer of 1 or more.
6. The composition of claim 1, wherein the alkenyl groups are each independently selected from the group consisting of a vinyl group, an allyl group, a propenyl group, an isopropenyl group, a butynyl group, a hexenyl group, and a cyclohexenyl group.
7. The composition of claim 1, wherein the alkenyl groups of the organopolysiloxane are vinyl groups.
8. The composition of claim 5, wherein "a" is an integer of from 100 to 1,000.
9. The composition of claim 1, wherein the organohydrogenpolysiloxane has the following formula:

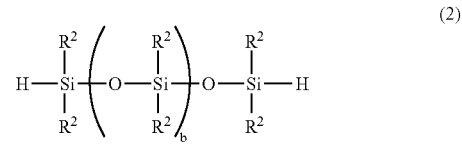

wherein $R^2$ is independently a substituted or unsubstituted monovalent hydrocarbon group free of aliphatic unsaturation, and "b" is 0 or greater.
10. The composition of claim 9, wherein $R^2$ is at least one of methyl, ethyl, propyl, chloromethyl, bromoethyl, 3,3,3-trifluoropropyl, cyanoethyl, phenyl, chlorophenyl and fluorophenyl.
11. The composition of claim 9, wherein "b" is from 10 to 50.
12. The composition of claim 1, wherein the organohydrogen polysiloxane is present in an amount so that 0.5 to 2 mols of Si—H groups in the organohydrogen polysiloxane are available per mol of alkenyl groups in the organopolysiloxane.
13. The composition of claim 1, wherein the organohydrogenpolysiloxane is present in an amount so that from 0.3 to 3 mols of Si—H groups in the organohydrogen polysiloxane are available per mol of alkenyl groups in the organopolysiloxane.
14. The composition of claim 1, wherein the platinum group base securing catalyst is present in an amount of from 1.0 to 100 ppm based on the weight of the organopolysiloxane.
15. The composition of claim 1, wherein the platinum group base securing catalyst is chloroplatinic acid.

16. The composition of claim 1, comprising an organohydrogen polysiloxane of the following formula:

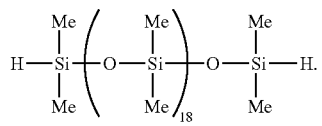

17. A cured composition obtained by curing the composition of claim 1.

18. The cured composition of claim 1, having a penetration of from 40 to 120.

19. The composition of claim 1, wherein all of the organohydrogen polysiloxanes have hydrogen atoms directly bonded to silicon atoms only at both ends of a molecular chain.

* * * * *